United States Patent Office 2,989,245
Patented June 20, 1961

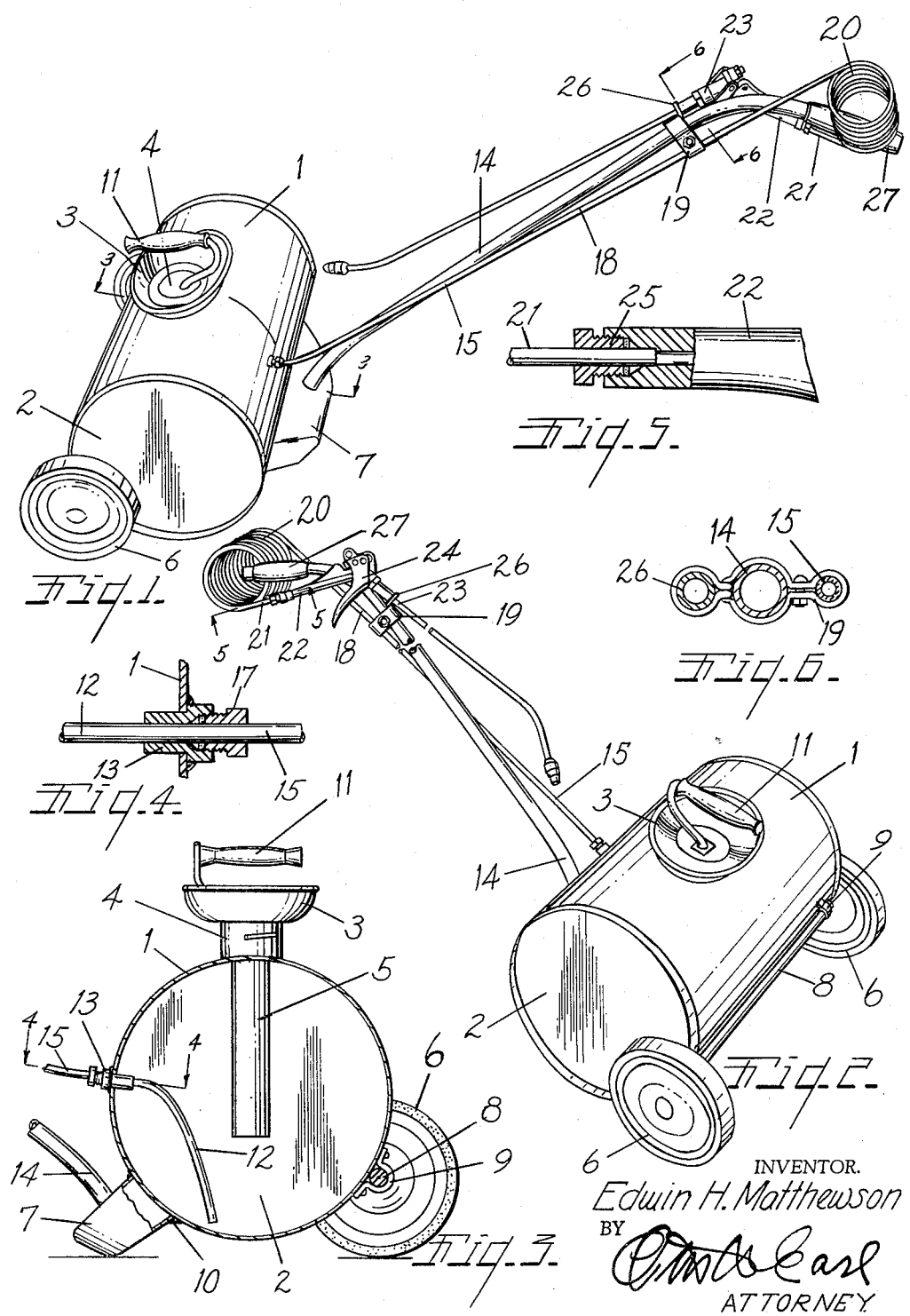

2,989,245
MOBILE SPRAYER
Edwin H. Matthewson, Saranac, Mich., assignor to Universal Metal Products Company, Saranac, Mich.
Filed Aug. 4, 1958, Ser. No. 753,033
10 Claims. (Cl. 239—175)

This invention relates to a manually manipulated Mobile Sprayer. The main objects of this invention are:

First, to provide a wheeled manually manipulated sprayer which may be operated to meet various operating use requirements with relatively little manual effort or labor.

Second, to provide a mobile sprayer apparatus which includes a discharge hose or conduit which automatically retracts when not under extending stress into compact form and adjacent the handle of the sprayer but which permits free swingable use manipulation of the discharge nozzle.

Third, to provide a sprayer having these advantages which is relatively simple and a structure which is light in weight and at the same time strong and durable.

Objects relating to details and economies of the invention will appear from the description to follow. The invention is defined and pointed out in the claims.

A preferred embodiment of the invention is illustrated in the accompanying drawing, in which:

FIG. 1 is a rear perspective view of a sprayer embodying my invention.

FIG. 2 is a front perspective view with parts of the handle and hose broken away.

FIG. 3 is a fragmentary view partially in section on a line corresponding to line 3—3 of FIG. 1.

FIG. 4 is an enlarged fragmentary view partially in section on a line corresponding to line 4—4 of FIG. 3.

FIG. 5 is an enlarged fragmentary view partially in section on a line corresponding to line 5—5 of FIG. 2.

FIG. 6 is an enlarged fragmentary view in sections on a line corresponding to line 6—6 of FIG. 1.

The embodiment of my invention illustrated comprises a receptacle or tank 1 of cylindrical section having end walls 2. The tank is provided with a filling funnel 3 at the top thereof and with an air pump designated generally by the numeral 4, the cylinder 5 of which depends into the tank, see FIG. 3. The details of the pump are not illustrated as usable pumps are known in the art.

The tank is supported by the wheels 6 and the support or rest member 7. The wheels are mounted on the axle 8 disposed longitudinally of the tank and secured thereto as by the clips 9.

The support 7 is disposed angularly relative to the axle and is fixedly secured to the tank desirably by means of welds indicated at 10, see FIG. 3.

The wheels 6 overlap the ends of the tank. When the tank is in rest position it is supported by the wheels and rest member 7, see FIG. 3. In this rest position the funnel faces upwardly and the pump is supported for manipulation by its handle 11. The tank is provided with an eduction or discharge tube 12 which is secured to the side of the tank by the member 13 and depends into the tank terminating adjacent the bottom thereof. The spraying solution is discharged as a result of pressure within the tank produced by the air pump.

The handle 14 is secured to the support member 7, the particular connection not being illustrated as it may be a welded connection or a detachable connection. A detachable connection has the advantage of disassembling for shipment and storage.

In the embodiment illustrated the eduction tube or conduit 12 is formed integrally with the hose member designated generally by the numeral 15, see FIG. 4. The combined hose member and eduction conduit is disposed through coupling member 13 and secured therein by the combined packing gland seal and supporting member 17. The hose member 15 is desirably formed of flexibly resilient tubular plastic material and includes a substantially straight inner section 18 disposed alongside of the handle and supportedly connected thereto by means of the clip 19. The hose member includes a springably resilient normally spirally coiled portion 20 which, when it is in its retracted coiled position, is positioned adjacent the handle, desirably at the side thereof as illustrated. The outer end 21 of this hose member is connected to the handle 22 of the spray nozzle member designated generally by the numeral 23.

The spray nozzle member 23 is provided with a valve controlled by the hand piece or lever 24; the details of the spray nozzle member are not illustrated as known spray nozzles may be used.

The outer end 21 of the hose member projects into the nozzle member handle 22 and is sealed and secured therein by the packing gland 25, see FIG. 5. The nozzle member is provided with a lug 26 engageable with the clip 19 on the handle 22 of the sprayer to support the nozzle member when not in use as illustrated in FIGS. 1 and 2. When the nozzle member is so engaged the hose portion 20 is relieved of stress and retracts into its coiled form automatically, and is supported at one side of or adjacent to the grip 27 of the handle.

The sprayer of my invention may be manipulated with relatively little manual effort and the tank may be of considerable size as it is transported on wheels, and when at rest or in rest position is supported in upright position without any load upon the handle. The sprayer may be manipulated on its wheels to position it relative to the object being sprayed or may be moved about on its wheels with one hand of the operator while the operator is manipulating the discharge nozzle with his other hand. The hose is of such length as to permit either of these manipulations, yet, when not under extending stress the coils retract so that there is no dangling hose part to trip the operator or impede his manipulation of the nozzle. Also, no looping or other hose manipulation is required when the sprayer's use is discontinued.

I have illustrated and described my invention in a highly practical embodiment thereof. I have not attempted to illustrate or describe other adaptations or modifications which I contemplate as I believe this disclosure will enable those skilled in the art to embody or adapt my invention as may be desired.

Having thus described the invention what is claimed as new and desired to secure by Letters Patent is:

1. In a mobile sprayer the combination of an elongated tank of cylindrical section disposed horizontally, an axle disposed longitudinally of and secured to the tank, wheels on said axle disposed in overlapping relation to the ends of the tank, a support member mounted on said tank in angularly spaced relation to said axle and coacting with said wheels to support the tank in upright position, a handle secured to said support member to project laterally relative to the tank, a springably resilient hose member comprising an inner portion of approximately the length of the handle supportedly connected thereto adjacent the outer end thereof and terminating at its inner end in an eduction conduit depending into the tank, said hose member including a springably resilient normally spirally coiled portion disposed when in collapsed position adjacent the outer end of the handle, and a manually manipulatable nozzle member connected to the outer end of said normally coiled portion of said hose member, said nozzle member being provided with a support releasably engageable with the handle.

2. In a mobile sprayer the combination of an elongated tank of cylindrical section disposed horizontally, an axle disposed longitudinally of and secured to the tank, wheels on said axle disposed in overlapping relation to the ends of the tank, a support member mounted on said tank in angularly spaced relation to said axle and coacting with said wheels to support the tank in upright position, a handle secured to said support member to project laterally relative to the tank, a springably resilient hose member comprising an inner portion at its inner end to an eduction conduit depending into the tank, said hose member including a springably resilient normally spirally coiled portion disposed when in collapsed position adjacent the outer end of the handle, and a manually manipulatable nozzle member connected to the outer end of said normally coiled portion of said hose member.

3. In a mobile sprayer the combination of an elongated tank of cylindrical section disposed horizontally, an axle disposed longitudinally of and secured to the tank, wheels on said axle disposed in overlapping relation to the ends of the tank, a handle operatively connected to said tank to project laterally therefrom, a springably resilient hose member comprising an inner portion of approximately the length of the handle supportedly connected thereto adjacent the outer end thereof and terminating at its inner end in an eduction conduit depending into the tank, said hose member including a springably resilient normally spirally coiled portion disposed when in collapsed position adjacent the outer end of the handle, and a manually manipulatable nozzle member connected to the outer end of said normally coiled portion of said hose member, said nozzle member being provided with a support releasably engageable with the handle.

4. In a mobile sprayer the combination of an elongated tank of cylindrical section disposed horizontally, an axle disposed longitudinally of and secured to the tank, wheels on said axle disposed in overlapping relation to the ends of the tank, a handle operatively connected to said tank to project laterally therefrom, a springably resilient hose member comprising an inner portion connected at its inner end to an eduction conduit depending into the tank, said hose member including a springably resilient normally spirally coiled portion disposed when in collapsed position adjacent the outer end of the handle, and a manually manipulatable nozzle member connected to the outer end of said normally coiled portion of said hose member.

5. In a mobile sprayer the combination of an elongated tank disposed horizontally, wheels on said tank, a support member mounted on said tank in angularly spaced relation to said wheels and coacting therewith to support the tank in upright position, a handle secured to said support member to project laterally relative to the tank, a springably resilient hose member comprising an inner portion of approximately the length of the handle supportedly connected thereto adjacent the outer end thereof and connected at its inner end to said tank, said hose member including a springably resilient normally spirally coiled portion disposed when in collapsed position adjacent the outer end of the handle, and a manually manipulatable nozzle member connected to the outer end of said normally coiled portion of said hose member.

6. In a mobile sprayer the combination of a tank, wheels on said tank, a handle operatively connected to said tank, a resiliently yieldable hose member comprising an inner portion of approximately the length of the handle supportedly connected to the handle adjacent the outer end thereof and connected at its inner end to said tank, said hose member including a springably resilient normally spirally coiled portion at the outer side of its said connection to said handle and disposed when in collapsed position adjacent the outer end of the handle, and a manually manipulatable nozzle member connected to the outer end of said normally coiled portion of said hose member.

7. In a mobile sprayer, the combination of a tank provided with supporting wheels, a handle connected to said tank to project laterally therefrom, a resiliently yieldable hose member comprising an inner portion of approximately the length of the handle supportedly connected to the handle adjacent the outer end thereof and connected at its inner end to said tank, said hose member including a springably resilient spirally coiled portion at the outer side of its said connection to said handle and normally disposed when in collapsed position adjacent the outer end of the handle, and a manually manipulatable nozzle member connected to the outer end of said normally coiled portion of said hose member, said nozzle member being provided with a support releasably engageable with the handle.

8. In a mobile sprayer, the combination of a tank provided with supporting wheels, a handle connected to said tank to project laterally therefrom, a resiliently yieldable hose member comprising an inner portion of approximately the length of the handle supportedly connected to the handle adjacent the outer end thereof and connected at its inner end to said tank, said hose member including a springably resilient spirally coiled portion normally disposed when in collapsed position adjacent the outer end of the handle, and a manually manipulatable nozzle member connected to the outer end of said normally coiled portion of said hose member.

9. In a manually manipulatable mobile sprayer, the combination of an elongated tank of cylindrical section disposed horizontally, an axle disposed longitudinally of and secured to said tank in forwardly spaced relation to the vertical center of the tank, wheels mounted on said axle with portions thereof projecting downwardly relative to the bottom of the tank, a support member mounted on said tank in rearwardly spaced relation to said wheels and to the vertical center of the tank and co-acting with said wheels to support the tank in upright rest position, said wheels and support member being dimensioned so that the bottom of the tank is spaced from the surface on which the wheels and support member are engaged when the sprayer is in rest position on a supporting surface, said tank being provided with a pump which is in use position when the sprayer is in such rest position, a handle fixedly secured to the support member to project upwardly and rearwardly relative to the tank when the sprayer is in rest position and in translatable position on said wheels, a discharge hose connected to said tank and provided with a discharge nozzle, said hose being supportedly connected to said handle in outwardly spaced relation to its connection to said tank and including a manipulatable portion of substantial length at the outer side of its said connection to said handle.

10. In a manually manipulatable mobile sprayer, the combination of an elongated tank of cylindrical section disposed horizontally, an axle disposed longitudinally of and secured to said tank in forwardly spaced relation to the vertical center of the tank, wheels mounted on said axle with portions thereof projecting downwardly relative to the bottom of the tank, a support member mounted on said tank in rearwardly spaced relation to said wheels and to the vertical center of the tank and co-acting with said wheels to support the tank in upright rest position, said wheels and support member being dimensioned so that the bottom of the tank is spaced from the surface on which the wheels and support member are engaged when the sprayer is in rest position on a supporting surface, said tank being provided with a pump which is in use position when the sprayer is in such rest position, a handle fixedly secured to the support member to project upwardly and rearwardly relative to the tank when the sprayer is in rest position and in translatable position on said wheels, a discharge hose connected to said tank.

References Cited in the file of this patent

UNITED STATES PATENTS

| | | |
|---|---|---|
| 1,057,616 | Booz et al. | Apr. 1, 1913 |
| 1,114,592 | De Witt | Oct. 20, 1914 |
| 1,764,439 | Fuhrmann | June 17, 1930 |
| 1,806,192 | Collins | May 19, 1931 |
| 2,277,864 | Horvath | Mar. 31, 1942 |
| 2,418,468 | Grant | Apr. 8, 1947 |
| 2,510,861 | Boal | June 6, 1950 |
| 2,544,120 | Wolfe | Mar. 6, 1951 |
| 2,621,073 | Behrens | Dec. 9, 1952 |
| 2,661,982 | Hudson | Dec. 8, 1953 |
| 2,719,754 | Weller | Oct. 4, 1955 |
| 2,769,998 | Hunter | Nov. 13, 1956 |
| 2,818,299 | Payne | Dec. 31, 1957 |